United States Patent [19]
O'Neall et al.

[11] Patent Number: 5,621,666
[45] Date of Patent: Apr. 15, 1997

[54] PLANTER MONITOR

[75] Inventors: Donald L. O'Neall, Downs; Richard T. Borovec, Champaign, both of Ill.

[73] Assignee: Dynavisions, Inc., Downs, Ill.

[21] Appl. No.: 425,912

[22] Filed: Apr. 20, 1995

[51] Int. Cl.⁶ ................................................. G01N 15/00
[52] U.S. Cl. ........................................................ 364/555
[58] Field of Search .................................. 340/684, 606,
340/524, 609; 111/903, 180; 324/663; 221/3,
13, 8, 21; 377/6, 24, 24.1, 30; 364/555

[56] References Cited

U.S. PATENT DOCUMENTS

| | | | |
|---|---|---|---|
| 3,927,400 | 12/1975 | Knepler | 377/6 |
| 4,159,064 | 6/1979 | Hood | 221/8 |
| 4,225,930 | 9/1980 | Steffen | 364/555 |
| 4,238,790 | 12/1980 | Balogh et al. | 340/684 |
| 4,333,096 | 6/1982 | Jenkins | 340/684 |
| 4,369,895 | 1/1983 | McCarty et al. | |
| 4,392,611 | 7/1983 | Bachman et al. | |
| 4,491,241 | 1/1985 | Knepler et al. | |
| 4,523,280 | 7/1985 | Bachman | |
| 4,630,773 | 12/1986 | Ortlip | |
| 4,710,757 | 12/1987 | Haase | 340/684 |
| 4,924,418 | 5/1990 | Bachman et al. | |

Primary Examiner—James P. Trammell
Attorney, Agent, or Firm—Emrich & Dithmar

[57] ABSTRACT

A stand-alone monitoring apparatus is provided for monitoring a plurality of selectable functions of an agricultural planter. The planter includes a plurality of seed sensors, each associated with a corresponding seed dispensing unit and generating a seed signal representative of the depositing of a seed by the associated seed dispensing unit. The monitoring apparatus includes memory for cumulatively storing population data. The population data includes a cumulative count of seeds dispensed by each dispensing unit, and a cumulative count of seeds dispensed by all the dispensing units. A microprocessor simultaneously receives seed signals from selected seed sensors, asynchronously accumulates and updates the cumulative counts associated with the selected seed sensors, and asynchronously stores the updated cumulative counts in the memory. The monitoring apparatus is intended to monitor signals from up to 16 seed sensors. In a related implementation, multiple data collectors are used to monitor and collect population data locally, i.e., proximate the monitored rows and sensors. The collected data is then serially communicated to a monitor unit in the tractor cab to cut down on the necessary cabling.

33 Claims, 4 Drawing Sheets

PLANTER MONITOR

BACKGROUND OF THE INVENTION

1. Field of the Invention

The present invention relates generally to a monitor for a planting machine and, more particularly, to a monitor for providing real-time information about the performance of one or more dispensing units on a farm implement.

2. Description of the Prior Art

Planting machines, such as row-crop planters and grain drills, are widely used in the agricultural industry to provide a mechanized and quick manner of dispensing seeds, grain and the like material over a tract of land. Such machines generally are provided with a plurality of dispensing units carried on a single frame for simultaneously dispensing the material over a plurality of uniform rows. Electronic monitors coupled to the dispensing units by way of appropriate sensors, are well known in the art for providing the farmer with a reasonable means to monitor the dispensing process and ensure against over and under distribution.

Monitors provide a way to observe seed population planted by each planting or dispensing unit, as well as by the planting machine as a whole. A conventional electronic monitor is shown in U.S. Pat. No. 4,225,930 to Steffen. The Steffen monitor is a microprocessor based controller system coupled to a user accessible control interface, and operating in accordance with a predetermined program, to sequentially receive and store seed population data with regard to all or select rows of a multi-row seed planter. Seed population monitoring involves determining the number of seeds planted by each planting machine, the ground speed of the planting machine, the number of rows being planted, and the row width or spacing between rows.

The Steffen monitor is provided with a serial scanning non-multitasking architecture which stores multiplexed data from respective seed sensors simultaneously in associated memory locations therewith. Because the scanning process is sequential rather than asynchronous, there is no true real-time processing of seed population data. The accuracy of the monitor is significantly compromised particularly at high seed distribution rates.

Furthermore, because the programming language of the Steffen monitor is in assembly code, a cumbersome and hardware specific language, additions or further customizing of the monitor to suit a particular user's farming demands, become impossible to perform at a reasonable cost.

The user interface of the Steffen control and display panel is also lacking. A rotary switch and cumbersome UP/DOWN switches are mainly provided to facilitate user selection of one of a fixed, unvarying number of monitor functions, associated data for which are displayed on function predefined LCDs. Consequently, system reconfiguration for the purpose of adding new functions or controls, becomes all but impossible.

It is readily apparent, that the Steffen monitor was designed to be useful as a monitor and display unit of seed population data for farm implements provided with a limited number of row planting units, providing accurate detection of such population data only at low seed population densities. Many modern day farm planters have as many as 64 or more dispensing units. For such machines, the Steffen control and display panel makes effective monitoring by the operator all but impossible.

Additionally, with the advent of improved seed sensors capable of providing accurate detection at densities as high as one to five million plus seeds per acre, the sequential scanning process of the Steffen monitor is inadequate in terms of its ability to provide accurate seed population data to the user.

As seed sensor technology further continues to improve, monitoring of seed activity with conventional monitors becomes impossible. Consequently, there is a need for a monitor which will function equally well at high seed densities.

There is also a need for an improved monitor which is user friendly and easily reconfigurable for customization to most modern day planters including row-crop planters and grain drills. There is also a need for a monitor capable of connecting, remotely or otherwise, to an external device for the purpose of communicating monitor information to and from thereof. There is also a need for the display to be provided with its own dedicated memory so that the user may, at her option, retrieve and compare previously displayed data.

Additionally, as the demand for farm implements carrying as many as 64 or more planter units is becoming more common, there is a need for a monitor suitable for use with all types of planters, requiring little or no modification.

More recently, the surge of precision farming products and technologies, involving essentially the integration of a network of Global Positioning Systems (GPS) satellites with monitors, has created a demand for monitors that are easily expandable and easily configurable to accept technologies of the future. Consequently, there is a need for a monitor that is sufficiently advanced so as to be easily integrated with prospective GPS technology, as well as capable of being networked with external peripherals and the like equipment.

SUMMARY OF THE INVENTION

It is a general object of the present invention to provide a new and improved monitoring apparatus for giving the operator of a multi-row planter useful real-time information about the performance of the individual planter units, and of the planter as a whole.

It is another object of the present invention to provide a monitor having a multi-processing highly integrated microprocessor-based embedded controller system providing real-time processing of seed population data by asynchronously sensing and detecting each of the multi-row units of the planter.

It is another object of the present invention to provide a monitor including a software controlled microprocessor-based system, programmed in a higher level language, to allow the monitor to be reprogrammed quickly and at low cost for customizing to an operator's specific needs, as well as for providing flexibility for function and system expansion.

It is another object of the present invention to provide a monitor for use with seed sensors of the type accurately generating seed detection signals at densities as high as one to five million plus seeds per acre.

It is yet another object of the present invention to provide a monitor with an improved control and display panel that is both user friendly (i.e., easier to read from and input information to), and which facilitates the addition of basically limitless additional functions to the monitor.

Another object of the present invention is to provide a monitor which operates more like a general purpose computer and can be optionally configured with communication ports to facilitate remote and/or direct coupled communication to a host system or the like.

It is another object of the invention to provide a monitor whose display controls include dedicated memory for storing the displayed data and for displaying the stored data upon demand.

These and other features of the invention are attained by providing a monitoring apparatus for monitoring a plurality of selectable functions of an agricultural planter. The planter includes a plurality of seed sensors, each associated with a corresponding seed dispensing unit and each generating a seed signal representative of the depositing of each seed by the associated seed dispensing unit. The monitoring apparatus includes memory for cumulatively storing population data. The population data includes a cumulative count of seeds dispensed by each individual dispensing unit as well as a cumulative count of seeds dispensed by all the dispensing units. A microprocessor simultaneously receives seed signals from selected seed sensors, asynchronously accumulates and updates the cumulative counts associated with the selected seed sensors, and asynchronously stores the updated cumulative counts in the memory.

In accordance with a second preferred embodiment, there is provided a monitor system for monitoring a plurality of selectable functions of an agricultural planter. The planter includes a plurality of groups of seed sensors. Each seed sensor is associated with a corresponding seed dispensing unit and provides a seed signal representative of the depositing of each seed by the sensor's associated seed dispensing unit. The monitor system includes a plurality of data collectors. Each data collector is associated with a corresponding one of the groups of seed sensors, and is responsive to respective seed signals therefrom. Each data collector includes a data collector memory for cumulatively storing population data counts with respect to each of associated ones of the dispensing units, and a cumulative count of the stored population data counts. Each data collector also includes a data collector microprocessor which simultaneously receives a plurality of seed signals from selected ones of the seed sensors associated with that data collector, asynchronously accumulates and updates the corresponding population data count for each selected seed sensor, and asynchronously stores the updated population data counts and the cumulative count in the data collector memory. A monitor remotely located in the tractor cab of the planter is coupled to the data collectors, they being located near their associated sensors. The monitor selectively receives the population data counts and the cumulative count from each of the data collectors upon demand.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
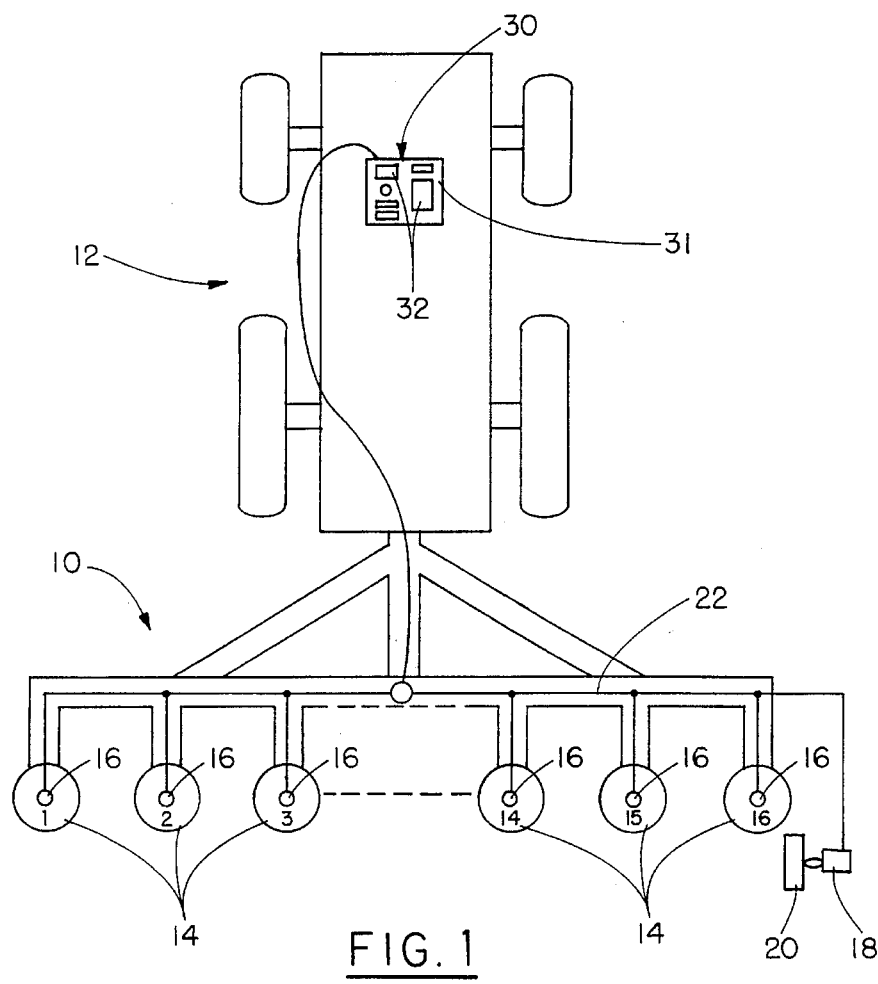
FIG. 1 is a plan view of a seed planter, partially in diagrammatic form, wherein the apparatus of this invention is advantageously incorporated.

Referring to the drawings, the present invention will be described in conjunction with a multi-row planting machine. FIG. 1 illustrates a mobile, multi-row seed planting machine 10, transported by a tractor 12, over a field to be planted. The planting machine or planter 10 may be of various known constructions and need not be described in detail. It suffices to state that the planter 10 includes a plurality of seed dispensing units or chutes 14, through which seeds, including such seeds as corn, soybean and grain, are delivered to be planted in the ground. In the particular embodiment illustrated, the seed dispensing units 14 are sixteen in number. It will be understood, however, that the monitoring apparatus of the invention may be readily adapted for association with planters having any desired number of dispensing units 14. The dispensing units 14 may be of various known construction and need not be described in detail.

The seed dispensing units 14 each have associated therewith a seed sensor 16, which is adapted to provide an output signal in response to the passage of a seed through the associated seed dispensing unit 14. The seed sensors 16 therefore are used to monitor the dispensing of seeds. The technology of the seed sensor 16 is not important provided the sensor outputs a digital pulse for each seed dispensed.

The planter 10 also incorporates a distance (or ground speed) sensor 18, conveniently mounted adjacent to a wheel such as a press wheel 20 of the seed planter 10. The distance sensor 18 provides information on the rotational velocity of some part of the planter 10. This sensor may sense magnetic properties (magneto-resistive, Hall-effect, variance reluctance, etc.) or may be a proximity sensor detecting teeth on a gear or timing wheel. The preferred implementation is a magneto-resistive sensor because it is independent of magnet polarity and inherently very sensitive allowing more flexibility in mounting. However, any of the above described sensors are believed to be equivalent for purposes of this invention as they are physically and logically interchangeable.

Suitable wire harnesses, designated generally 22, electrically join the seed sensors 16 and distance sensor 18 with a stand-alone monitor 30, mounted on the planter 10, which contains within a housing 31 thereof, components of the monitoring apparatus of the present invention. These components in housing 31 in turn feed a control and display panel 32 on the front side of housing 31. Housing 31 is conveniently mounted on the tractor for viewing by the operator. The monitor 30 is generally provided with suitable electrical operating power via a suitable cable (not shown) from the battery.

Optionally, a flow sensor (not shown) may also be incorporated for conveniently measuring the number of gallons of liquid material (i.e., fertilizer, herbicide, etc.) dispensed through a metering system on the planter since its initialization. The general specification is that the sensor produce a digital pulse stream the frequency of which is proportional to the flow rate being monitored.

Figure 2:
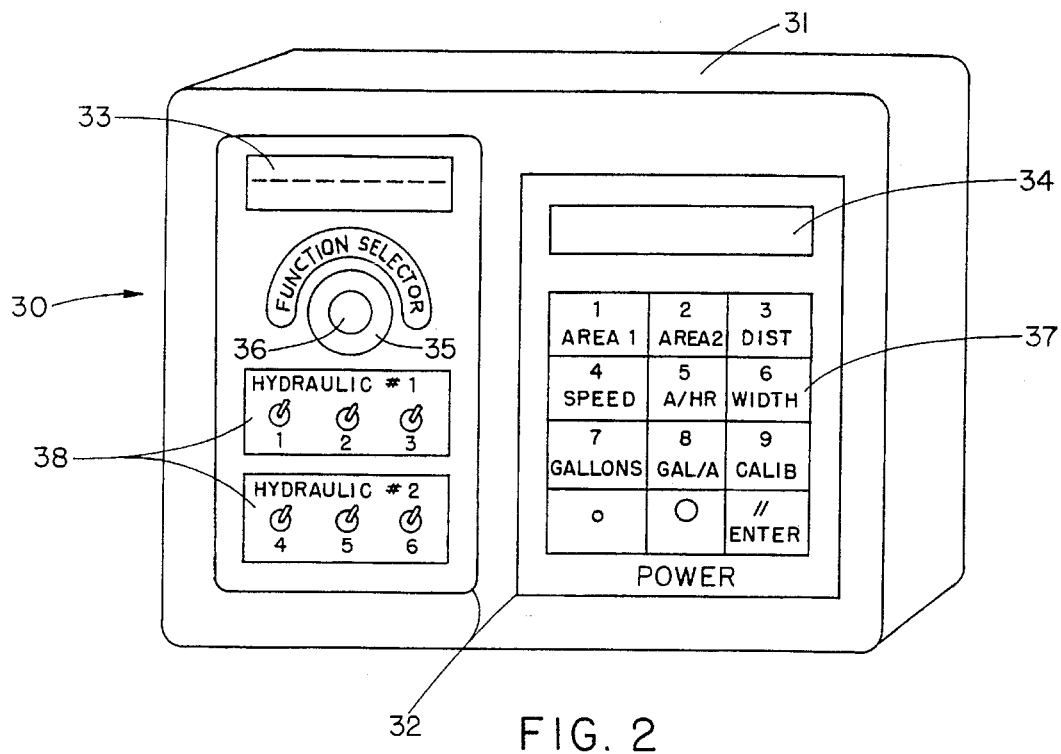
FIG. 2 is a front perspective view of the monitoring apparatus of the present invention.

The monitor 30, and particularly the control and display panel 32, are shown more clearly in FIG. 2. Included on the monitor 30 are two eight character alphanumeric LED displays 33, 34 used to output data to the operator. In the constructional embodiment, the full ASCII character set is supported as well as 16 user definable characters.

Data available to the user include:

Speed in miles per hour

Distance travelled since initialization

Two independent totalizers of area covered (in acres) since initialization

Current rate of coverage in acres per hour

Population in seeds per-acre for each monitored row

Population in seeds per foot for each monitored row

Real-time display of seed sensor activity (flashing "*")

Absolute count of seeds for each monitored row

Total flow in gallons since initialization

Current flow rate in gallons per acre

The displays 33, 34 are high efficiency yellow to ensure visibility under virtually all operating conditions. Provision is also made to allow the operator to vary the intensity of the display, all in a known manner.

The user inputs are essentially divided into two logical parts and include a rotary encoder 35 with integral push button switch 36 and a direct entry membrane keypad 37. The push button switch 36 is used to step through the set of functions available to the operator and the rotary encoder 35 is used to select subfunctions, to be described in greater detail below. The keypad 37 allows direct entry of numerical data as well as selection of basic non-planter related functions, also to be described below. The illustrated monitor 30 is intended to support up to sixteen seed sensors 16 and a distance sensor 18. A flow sensor may also be provided.

A small switching panel 38 is used to enable solenoid valves for controlling planter mechanical operations. In the exemplary embodiment, solenoid switching control is independent from the microprocessor controlled monitoring functions, however, it should be appreciated that all the functions may be, alternatively, implemented under microprocessor program control.

Figure 3:
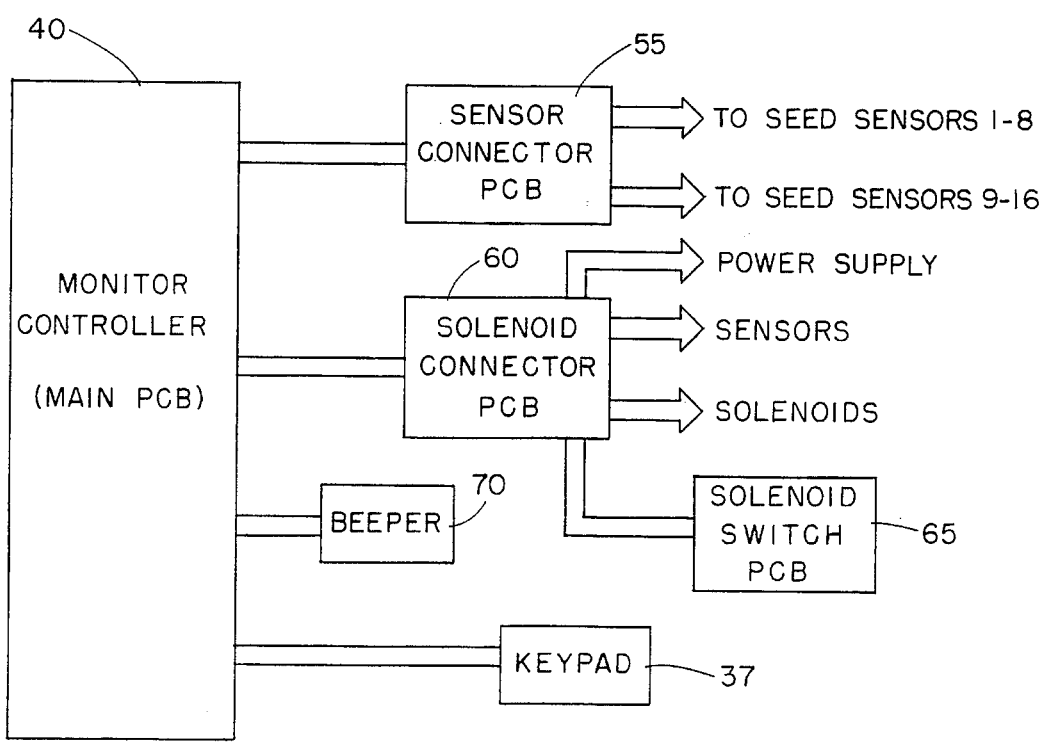
FIG. 3 is a block diagram of the main system printed circuit boards within the apparatus of FIG. 2.

Reference is now invited to FIG. 3, wherein the major components forming the invention are illustrated in block diagrammatic form. The hardware portion of monitor 30 consists essentially of a monitor main printer circuit board (Main PCB) 40, including a microprocessor, which will be described in detail herein below. A sensor connector PCB 55, for coupling power and signals to and from each of the sixteen sensors 16 to the monitor 30, is coupled to the Main PCB 40. A solenoid connector PCB 60 is also coupled thereto and contains the necessary switching logic (not shown) to implement switching of external hydraulic solenoids, by way of solenoid switch PCB 65. A beeper 70 and the keypad membrane 37 are fed directly by, or communicate with, the Main PCB 40.

The description of the Main PCB 40 will be described with reference to FIG. 4. PCB 40 contains both the essential monitor logic electronics as well as the interface I/O logic between the monitor 30 and the operator. As explained above, monitor 30 consists essentially of a microprocessor based controller coupled to sensor interfaces. In the constructional embodiment, there is included a microprocessor 41, corresponding to a Hitachi 64180 high integration MPU having an effective processor speed of 9.216 MHz, which provides both real-time data processing and display of seed population/planting events.

In the exemplary embodiment, system memory is implemented using a 32K by 8 CMOS EPROM 42 and a 32K by 8 CMOS RAM 43. Address decoding is done by Programmable Logic Arrays (not shown) in a manner well known in the art. The EPROM 42 is mapped into the address range 0x0000–0x7FFF. The RAM 43 is mapped into two disjoint address ranges, 0x8000–0xBFBF and 0xC000–0xFFBF. The RAM 43 may be battery backed-up to safely maintain the RAM data contents for many years.

The two LED displays 33, 34 are memory mapped for convenience in implementing the software. The left display 33 (normally displaying monitor functions such as seed and population counts) is mapped to the range 0xFFC0–0xFFFF. The right display 44, which normally displays implement data such as speed and distance, is mapped from 0xBFC0–0xBFFF. The displays 33, 34 are intelligent displays, such as those commercially available by Hewlett-Packard as HDSP-21 11, and contain all the memory and logic to display the full ASCII character set as well as user definable characters.

The Main PCB 40 includes input logic circuitry 44 coupled to receive input signals from the keypad 37 and the rotary encoder 35 and integral push button switch 36.

The membrane keypad 37 operates as 12 single pole single throw push buttons arranged in a four row three column matrix. In addition to numerical entry, the keypad 37 is used to directly select the following non-drill related functions, printed thereon:

AREA 1 - Requests the monitor to display the number of acres in Area 1 since initialized. The value is saved when power is turned off. It may be set to any value by pressing the ENTER key, entering the desired value, and pressing the ENTER key again. The value of the area changes as a function of the width of the implement and the distance travelled.
AREA 2 - Operates the same as Area 1. It is, however, totally independent.
DISTANCE - Displays the total distance travelled since initialization. The display is in feet for the first two miles. Thereafter the display is in miles. The value is saved when power is turned off. It may be set to any value by pressing the ENTER key, entering the desired value, and pressing the ENTER key again.
SPEED - Displays the current speed of the implement in miles per hour. A/HR - Displays the current speed of the implement in acres per hour.
WIDTH - Displays the width of the implement in inches. This value must be set during calibration to insure that the area related functions will operate properly. The value is saved when power is turned off. It may be set to any value by pressing the ENTER key, entering the desired value, and pressing the ENTER key again.
GALLONS - Displays the number of gallons, measured by an optional flow sensor, since initialization. The value is saved when power is turned off. It may be set to any value by pressing the ENTER key, entering the desired value, and pressing the ENTER key again.
GAL/A - Displays the current application rate, measured by an optional flow sensor, in gallons per acre.
CALIBRATE - Pressing the CALIBRATE key invokes the calibration submenu. The current item is shown in text for one second and is then is replaced by an abbreviated symbol and the current value of the item.
Circum        *C>
Circumference: Used for distance and speed
computations.
Lo Pop        *L>
Lower Population Limit: The value of the
lower population limit. Populations below
this value will cause the alarm to sound.
The value represents thousands of seeds per
acre, i.e. a value of 50 represents 50,000
seeds per acre. A value of 0 will cause
limit testing to be turned off.
Hi Pop        *H>
Upper Population Limit: The value of the
upper population limit. Populations above
this value will cause the alarm to sound.
The value represents thousands of seeds per
acre, i.e. a value of 350 represents 350,000
seeds per acre.
Tot Rows      *T>
Total Rows: The total number of rows
supported by the drill.
Act Rows      *A>
Active Rows: The number of rows which have
active sensors.
Updat Inc     *I>
Update Increment: The interval at which
population rates are updated, in acres.
Values may range from .01 to 1.00 acres. The
smaller the increment, the more often the
population will be updated. Note, however,
small acre increments will show larger
fluctuations in population. There is no
averaging of seed counts and the population
shown is for the current increment only.
Flow Con      *F>
Flow Constant: Used for volume and
application rate computations.

The rotary encoder 35, on the other hand, is utilized for function selection. The rotary encoder 35 allows functional changes to be made in software, removing the necessity to rewire a rotary switch.

The rotary encoder 35 and associated push button 36, are on the left of the control and display panel 32 and are used to select programmed drill functions. The push button 36 is used to step through the set of available functions and the rotary encoder 35 is used to select associated subfunctions. The following are some examples of available functions.

Population—Display population of last interval in thousands of seeds per acre. The rotary encoder 35 is used to select the appropriate monitored row. The average of the monitored rows may also be selectively displayed.

Seed Density—Display population in last interval in seeds per foot. The rotary encoder 35 is used to select the appropriate monitored row. The density as computed using the average of the monitored rows may be selectively displayed.

Sensor Activity—Display sensor activity. Each time a seed is detected by a sensor, a small "*" is displayed. The position of the "*" corresponds to the monitored row number. In the constructional embodiment, if the number of active rows is eight or less, the "*" occupies the entire height of the display with Row 1 shown on the left, Row 8 shown on the right. If the number of active rows is greater that eight, the "*" occupies half the height of the display. Rows 1 through 8 are shown in the top half and Rows 9 through 16 are shown in the bottom half. The rotary encoder 35 has no effect on the seed sensor activity display.

Absolute Seed Count—Display the absolute number of seeds detected, up to a predetermined maximum, by a sensor 16 since the monitor 30 has been turned on. The rotary encoder 35 selects the appropriate monitored row.

Display Brightness—Control the display brightness. Under some conditions, for example at night, the normal display brightness may be too high. Rotating the encoder 35 will change the brightness of the display. The next time the monitor 30 is powered up, the display will return to full brightness.

Referring back to FIG. 4, the beeper 70 is coupled to general purpose output circuitry 45 on PCB 40 and is used to indicate errors and abnormal conditions to the operator. The beeper 70 may be a self-oscillating piezoelectric device operating at about 3 Kilohertz.

Also included on the Main PCB 40 is an expansion connector 46 for optionally installing additional resources, such as a daughter board for implementing guidance system, GPS, or the like integration, thereby further enhancing monitor functionality. A control encoder 48 provides bus and system hardware control and similarly coupled for communication with the microprocessor 41 and memory components 42, 43. A CAN bus interface circuit 49 is also included to facilitate communication between the monitor 30 and the vehicle/tractor onboard computer.

The Main PCB 40 further includes sensor interface logic circuitry 50 associated with the distance sensor 18 and optional flow sensor, as well as seed sensor interface circuitry 51.

Figure 5:
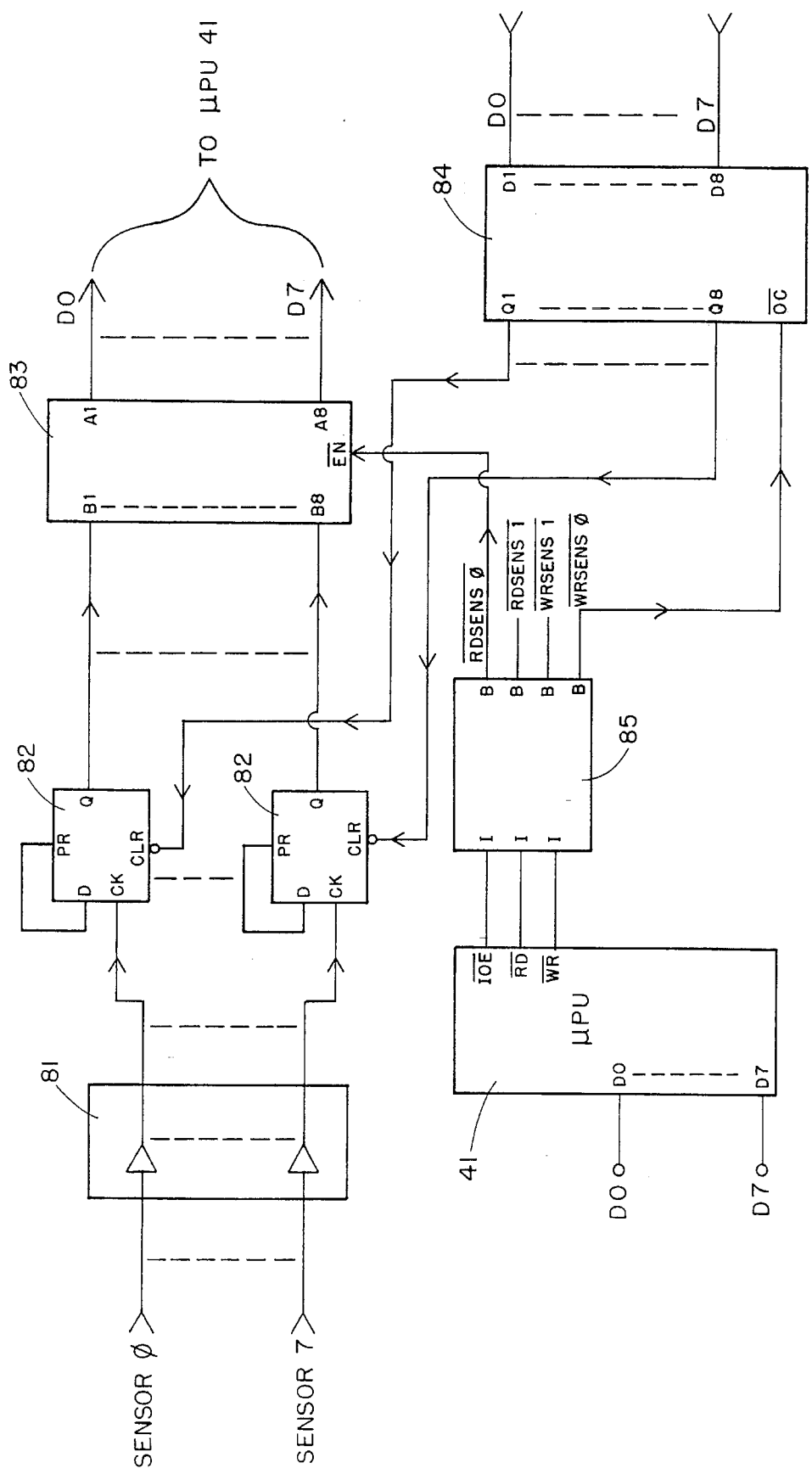
FIG. 5 is a schematic diagram of the seed sensor interface logic circuitry.

The seed sensor interface logic circuitry 51 is shown in greater detail in FIG. 5. In the constructional embodiment, the monitor 30 supports inputs from up to 16 seed sensors. FIG. 5 shows eight of the sixteen possible sensor signals (SENSOR0–SENSOR7) being presented to the monitor 30 for processing by the microprocessor 41. It should be appreciated that there are two identical sets of hardware, with signals $\overline{\text{RDSENS0}}$ and $\overline{\text{WRSENS0}}$ signals controlling the processing of sensor signals SENSOR0–SENSOR7, and signals $\overline{\text{RDSENS1}}$ and $\overline{\text{WRSENS1}}$ the time-multiplexed processing of signals SENSOR8–SENSOR15 (not shown).

Sensor signals SENSOR0–SENSOR7 are first buffered by a buffer 81, such as an 74LS244 IC which features a Schmitt trigger input with 400 millivolts of hysteresis. The buffered output signals are then applied to the clock input of a D Edge-triggered flip flop 82. The effect is the setting of flip flops 82 as corresponding input sensor signal lines SENSOR0–SENSOR7 are toggled, as in the instant an associated seed is dispensed.

The outputs of sensor flip flops 82 are presented on data bus D0–D7 and read by the microprocessor 41 via bus transceiver 83. The flip flops 82 are then immediately cleared by the microprocessor 41 by toggling appropriate bits in the clear register 84, a 74574 octal latch. A decoder 85, under microprocessor 41 control, selectively asserts signals $\overline{\text{WRSENS0}}$, $\overline{\text{RDSENS0}}$, $\overline{\text{WRSENS1}}$ and $\overline{\text{RDSENS1}}$ at appropriate intervals to provide time-multiplexing between first set of signals SENSOR0–SENSOR7 and the second set of signals SENSOR8–SENSOR15.

As the status of the sensor lines are presented to the microprocessor 41—eight sensor signals at a time (on data lines D0–D7)—the microprocessor 41 asynchronously processes the data, performing appropriate population data calculations, and averaging and updating operations, and stores the results in RAM 43. The microprocessor performed operations involving the monitoring of signals from each of the sixteen sensors 16 is performed as a background task by the microprocessor 41, in accordance with the underlying program written in a higher level language, such as in C Language, and stored in the EEPROM 42.

The high processing speed of the microprocessor 41 and its ability to asynchronously process as many as eight rows at a time, makes possible monitoring seed activity at seed densities as high as five million seeds per acre. The algorithms for initializing the hardware, including the distance and flow sensor interface circuitry, and reading and clearing the flip flops 82, and updating population data and the like are significantly mundane so as not to require discussion, and should be readily obvious from the above description of the hardware and the disclosed operation of the monitor.

As the tractor 12 moves, seed and distance counts are accumulated by the microprocessor 41. The speed, distance, and area covered by the moving tractor 12 are displayed continuously. They may be updated once a second to minimize flickering of the display. The time used in the computations for speed, distance and area is boxcar averaged to smooth the data.

The seed count (or population, or seed density) is displayed at a user defined interval. In the constructional embodiment, the interval is defined in hundredths of an acre. With minor changes to the software, the interval could alternatively be changed to a user specified distance, seed count, or time interval, so as not to be limited by the manufacturer predetermined interval.

When the computed population is above the upper limit or below the lower limit, the monitor activates an audible alarm and blinks the display for the row in error. In addition, if the row in error is not the currently displayed row then the monitor forces the row in error to be displayed. This monitor attribute is easily accomplished by the cold switching nature of the rotary encoder technology.

Figure 4:
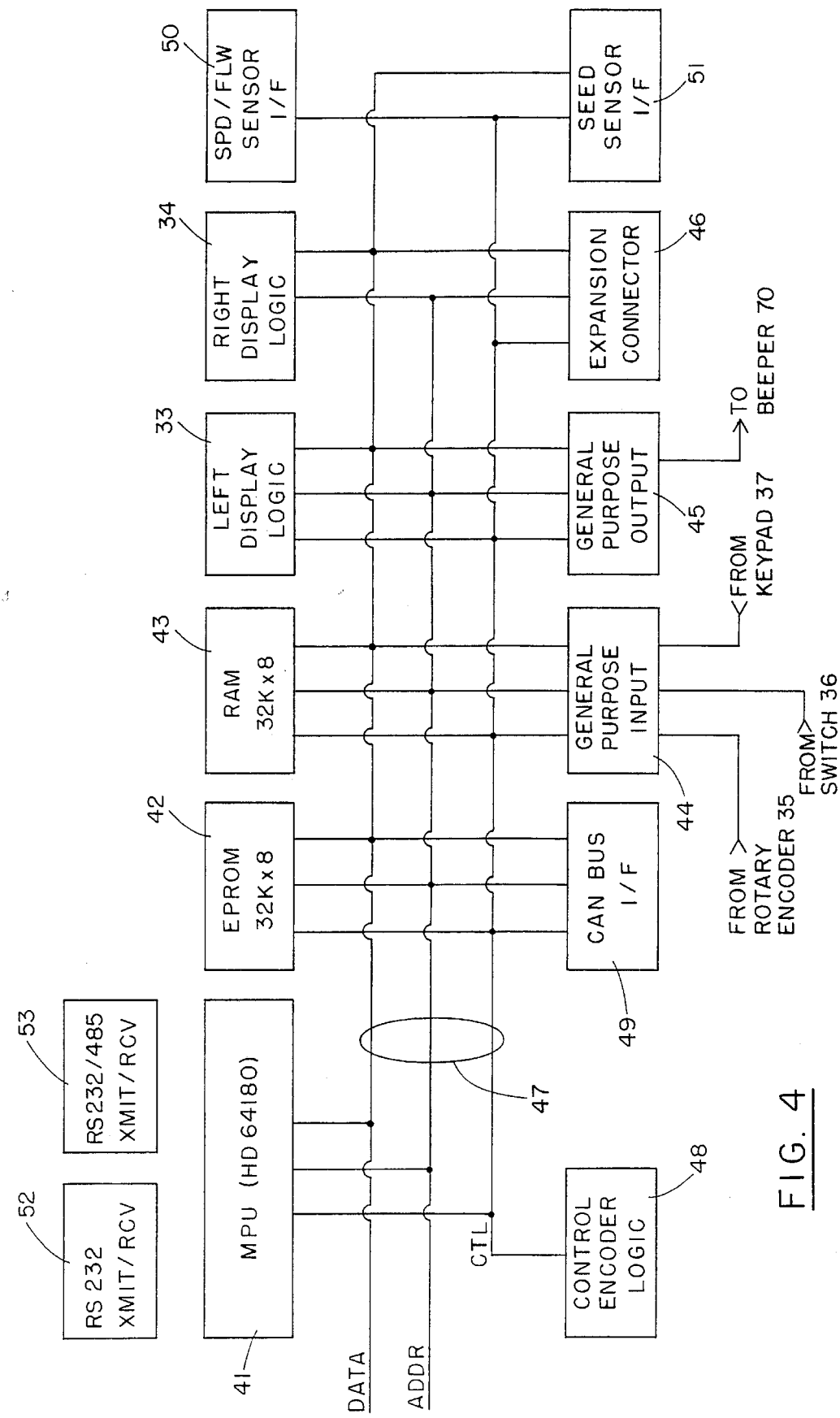
FIG. 4 is a block diagram of the processing components on the Main printed circuit board shown in FIG. 3.

As should be readily apparent, the monitor 30 operates very much the same as a general purpose computer and, in this regard, may also be provided with two-way communication support with an external device, via either of two available serial ports 52, 53 coupled directly to microprocessor 41 (see FIG. 4). With two way communication, monitor functions and or microprocessor control can be shared, relinquished, or communicated to and from the monitor 30 to an external peripheral. In the preferred constructional embodiment, serial ports 52, 53 are configured to receive/transmit RS232 level signals. However, port 53 may also be configured using a DS3695 transceiver to operate using RS-485 levels. The serial port connections further make possible the use of an external display (not shown) to monitor, in real-time, seed activity in graphical form, such as with bar graphs and the like, and in a manner which is practical and useful, and which would not impair the accuracy of the monitoring process.

Additionally, serial port communication makes possible remote data logging so that the monitor seed distribution/population data from one or more monitors can be remotely collected and logged by an external device, such as a host computer.

Figure 6:
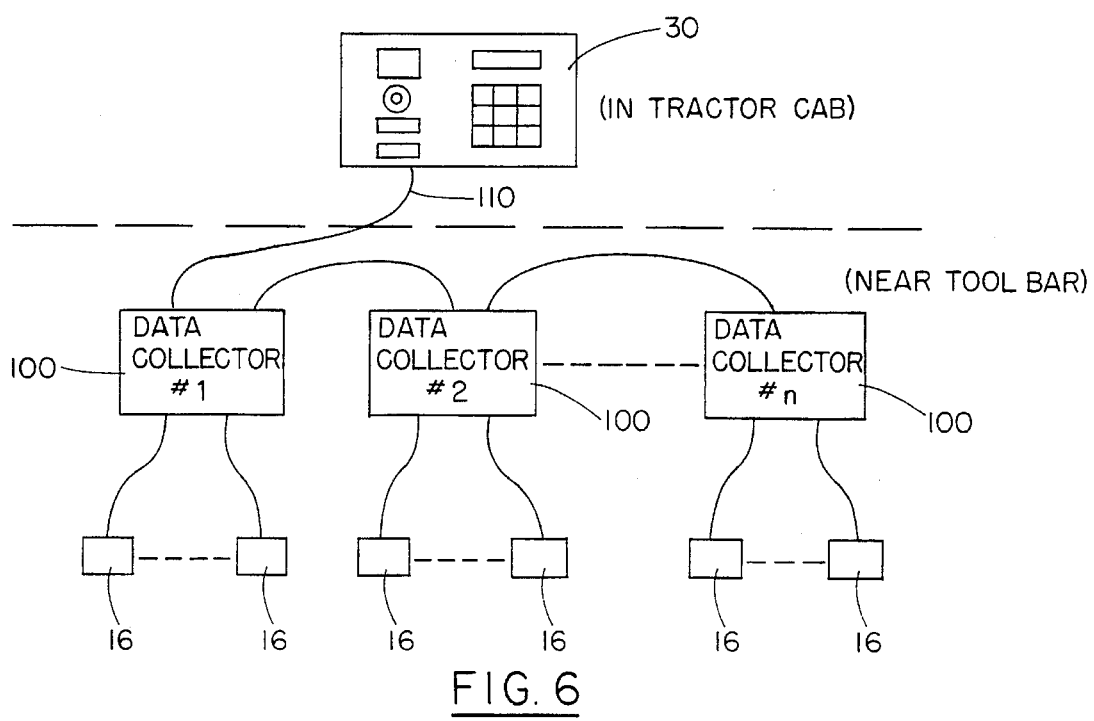
FIG. 6 is a block diagram in accordance with a second preferred embodiment, showing a monitoring system having a monitor coupled to a plurality of remote data collectors.

In an alternative implementation shown in FIG. 6, data collectors 100 are used to read and collect information from each of respectively coupled sensors 16. Up to sixteen sensors 16 may be attached to each data collector 100, in the same manner as the sixteen sensors 16 (see FIG. 5) which may be coupled to the monitor 30. All the data collectors 100 are situated near the sensors, rather than in the tractor cab, and communicate with the monitor 30, which is located in the tractor cab, by way of an RS232 serial connection 110 (via serial ports 52 or 53). The use of remotely located data collectors 100, allows an operator to monitor more than sixteen rows and in real-time. By having the data collectors 100 positioned close to individual sensors 16, the grave problem of extending cables from individual sensors 16 to the tractor cab where the monitor 30 is located, is obviated.

Each data collector 100, in turn, functions as a stand-alone data collection unit, relieving the monitor 30 of that task. The monitor 30 merely probes the network of daisy-chained or the like array of available data collectors 100, one at a time, and by way of a serial connection 110 therebetween, to provide the operator of monitor 30 with requested population and seed distribution data on demand, with respect to any of the data collectors 100. The monitor 30 may also continually poll all the data collectors and maintain cumulative or averaging information from the received data for the whole complement of rows, rather than for only a maximum of sixteen.

The architecture of the data collectors 100, while not shown, is intended to be substantially similar to that of the monitor 30, but for the fact that the control and display panel 32 and associated circuitry may be eliminated, thus significantly reducing the cost of a monitoring system requiring a number of data collectors 100.

Because each of the data collectors 100 operates independently and under dedicated microprocessor control to perform the necessary data collection, which data is then communicated to the monitor 30 upon demand, seed activity can be monitored on a real-time basis for an almost limitless number of rows.

It should be appreciated that the above described monitor 30 provides an improved user friendly human interface that is more ergonomic than prior art systems as well as allows for dynamic reconfiguring of the monitor software by the user.

The present monitor also gives the operator increased flexibility, expandability, and selectability not previously available, without compromising seed monitoring ability.

Until now, the need for monitors capable of monitoring modern planters equipped with a large complement of rows (48, 64, etc.) has been impossible, largely because of the problems associated with housing the necessary cabling, as well as with the inability of prior art monitors to accurately and usefully monitor and display high seed density activity.

The present invention is a drastic improvement over prior art monitors. The instant monitor displays data using fully formed characters (5×7 matrix) with the full alphabet and custom parameters available. The display is emissive (LED) and is readable under all lighting conditions and offers a wide angle of view.

Additionally, because data entry is facilitated using a numeric keypad, similar to a touch-tone phone keypad, direct numeric entry is made possible.

Thirdly, because an optical encoder is used to select monitor functions for various rows and because the encoder output is interpreted by software, the functions performed by the encoder may be dynamically changed depending on the circumstances. For example, should the user elect to monitor less than the full complement of rows, the rotary encoder software decreases the number of rows in a revolution and makes all rows occupy adjacent encoder positions.

Also, because the results of the monitored seed activity are stored in static read/write RAM which is sustained by battery backup, the RAM may conveniently be the same RAM as that used during stored program execution.

While particular embodiments of the present invention have been shown and described, it will be appreciated by those skilled in the art that additional changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A monitoring apparatus for monitoring a plurality of selectable functions of an agricultural planter, said planter including a plurality of seed sensors each associated with a corresponding seed dispensing unit and each generating a seed signal representative of the depositing of each seed by the associated seed dispensing unit, said monitoring apparatus comprising:

memory means for cumulatively storing population data, said population data including an associated cumulative count of seeds dispensed by each of said dispensing units, and a cumulative count of seeds dispensed by all said dispensing units; and a microprocessor responsive to receipt of a seed signal from one or more of said seed sensors for asynchronously accumulating and updating said cumulative counts associated with said selected seed sensors, and for asynchronously storing said updated cumulative counts in said memory means, wherein said seed signals are received simultaneously by said microprocessor and are provided to said microprocessor asynchronously relative to an operating speed of said microprocessor.

2. The monitoring apparatus of claim 1, wherein said microprocessor means includes means for selectively simultaneously receiving a first set of seed signals during a first time interval, and a second set of seed signals during a second time interval, wherein each said first and second time intervals are shorter than the duration between consecutive seed dispensing by individual dispensing units.

3. The monitoring apparatus of claim 1, further including means for selectively enabling or disabling the monitoring of a selected dispensing unit under operator control.

4. The monitoring apparatus of claim 1, further including a control and display panel comprising at least one alphanumeric LED display used to output data to the operator of the monitoring apparatus.

5. The monitoring apparatus of claim 4, wherein said alphanumeric LED display is coupled to dedicated memory for storing the displayed data and for displaying the stored data upon demand.

6. The monitoring apparatus of claim 1, wherein said alphanumeric LED display is adapted for pseudographic real-time display which flashes in synchronization with seed activity at presently monitored rows.

7. The monitoring apparatus of claim 1, wherein said monitoring apparatus is coupled to an external graphical display for real-time display in synchronization with seed activity at presently monitored rows.

8. The monitoring apparatus of claim 1, further including a control and display panel having a rotary encoder and integral push button switch, said push button switch being for stepping through said selectable functions and said rotary encoder being used to select subfunctions.

9. The monitoring apparatus of claim 1, further including a control and display panel having a keypad to facilitate direct entry of numerical and non-planter related functions.

10. The monitoring apparatus of claim 1, wherein said monitoring apparatus is coupled to at least one of a flow sensor and a distance sensor.

11. The monitoring apparatus of claim 1, wherein said microprocessor performs said updating and storing functions in the background allowing said dispensing units to be tested continuously from the initial time of seed distribution.

12. The monitoring apparatus of claim 1, wherein said microprocessor operates in accordance with a predetermined program written in a high-level language to facilitate adding additional functions.

13. The monitoring apparatus of claim 1, further including at least one communications port for establishing a connection link between said monitoring system and an external peripheral.

14. The monitoring apparatus of claim 1, further including a control and display panel having a plurality of solenoid controlling switches for remote operation of hydraulically controlled instruments on the planter.

15. The monitoring apparatus of claim 1, further including a control and display panel having at least one alphanumeric LED display used to output data to the operator of the monitoring apparatus, a rotary encoder and integral push button switch, said push button switch being for stepping through said monitoring apparatus selectable functions and said rotary encoder being used to select subfunctions, and a keypad to facilitate direct entry of numerical and non-planter related functions.

16. A monitor system for monitoring a plurality of selectable functions of an agricultural planter, said planter including a plurality of groups of seed sensors, each seed sensor associated with a corresponding seed dispensing unit, and each seed sensor providing a seed signal representative of the depositing of each seed by the associated seed dispensing unit, said monitor system comprising:

a plurality of data collectors, each data collector associated with a corresponding one of said groups of seed sensors, and responsive to respective seed signals therefrom, each said data collector including:

data collector memory means for cumulatively storing population data counts with respect to each of associated ones of said dispensing units, and a cumulative count of said stored population data counts; and a data collector microprocessor responsive to receipt of a seed signal from one or more of said seed sensors for asynchronously accumulating and updating said corresponding population data count for each said selected seed sensors, and for asynchronously storing said updated population data counts and said cumulative count in said data collector memory means, wherein said seed signals are received simultaneously by said microprocessor and are provided to said microprocessor asynchronously relative to an operating speed of said microprocessor; and a monitor remotely coupled to said data collectors for selectively receiving at least one of said population data counts and said cumulative count from each said data collectors upon demand.

17. The monitor system of claim 16, wherein said monitor includes a monitor microprocessor responsive to said cumulative count from each said data collectors for generating a total population data count.

18. The monitor system of claim 17, wherein said monitor further includes means for selectively displaying, in real-time, at least one of said total population data count, and the population data count associated with a selected one of said dispensing units.

19. The monitor system of claim 17, wherein said monitor further includes means for enabling or disabling the monitoring of a selected dispensing unit.

20. The monitor system of claim 17, wherein said data collectors and said monitor are coupled together in serial fashion to minimize cabling.

21. The monitor system of claim 17, wherein the planter includes a tractor cab and said monitor includes a control and display panel, said monitor being located inside the tractor cab to facilitate access to said control and display panel by an operator, said monitor being coupled by a serial connection to said data collectors, and said data collectors being similarly connected to each other for communication therebetween and with said monitor.

22. The monitor system of claim 17, wherein said monitor includes a control and display panel comprising at least one alphanumeric LED display used to output data to the operator of the monitor.

23. The monitor system of claim 22, wherein said alphanumeric LED display is coupled to dedicated memory for storing the displayed data and for displaying the stored data upon demand.

24. The monitor system of claim 22, wherein said alphanumeric LED display is adapted for pseudographic real-time display which flashes in synchronization with seed activity at presently monitored rows.

25. The monitor system of claim 17, wherein said monitor is coupled to an external graphical display for real-time display in synchronization with seed activity at presently monitored rows.

26. The monitor system of claim 17, wherein said monitor further includes a control and display panel having a rotary encoder and an integral push button switch, said push button switch being for stepping through said monitor system selectable functions and said rotary encoder being used to select subfunctions.

27. The monitor system of claim 17, wherein said monitor further includes a control and display panel having a keypad to facilitate direct entry of numerical and non-planter related functions.

28. The monitor system of claim 17, wherein said monitor is coupled to at least one of a flow sensor and a distance sensor.

29. The monitor system of claim 17, wherein said monitor and said data collector microprocessors perform said accumulating, updating and storing functions in the background, allowing said dispensing units to be tested continuously from the initial time of seed distribution.

30. The monitor system of claim 17, wherein said monitor and said data collectors operate in accordance with associated high-level language programs.

31. The monitor system of claim 17, wherein said monitor includes at least one communications port for establishing a connection link between said monitoring system and an external peripheral.

32. The monitoring apparatus of claim 17, wherein said monitor further includes a control and display panel having a plurality of solenoid controlling switches for remote operation of hydraulically controlled instruments on the planter.

33. The monitoring apparatus of claim 17, wherein said monitor further includes a control and display panel having at least one alphanumeric LED display used to output data to the operator of the monitoring apparatus, a rotary encoder and integral push button switch, said push button switch being for stepping through said monitoring apparatus selectable functions and said rotary encoder being used to select subfunctions, and a keypad to facilitate direct entry of numerical and non-planter related functions.

* * * * *